(12) United States Patent
Krause (10) Patent No.: US 10,562,385 B2
(45) Date of Patent: Feb. 18, 2020

(54) WINDOW ASSEMBLY, WINDOW PANE, AND WINDOW SEALING PROFILE

(71) Applicant: COOPER STANDARD GMBH, Lindau/Bodensee (DE)

(72) Inventor: Fritz Krause, Hergatz (DE)

(73) Assignee: COOPER STANDARD GMBH, Lindau/Bodensee (DE)

( * ) Notice: Subject to any disclaimer, the term of this patent is extended or adjusted under 35 U.S.C. 154(b) by 55 days.

(21) Appl. No.: 15/773,104

(22) PCT Filed: Jan. 18, 2016

(86) PCT No.: PCT/EP2016/050919
§ 371 (c)(1),
(2) Date: May 2, 2018

(87) PCT Pub. No.: WO2017/076512
PCT Pub. Date: May 11, 2017

(65) Prior Publication Data
US 2018/0319260 A1  Nov. 8, 2018

(30) Foreign Application Priority Data
Nov. 2, 2015 (EP) .................................... 15192663

(51) Int. Cl.
*B60J 10/79* (2016.01)
*B60J 10/265* (2016.01)
(Continued)

(52) U.S. Cl.
CPC .................. *B60J 10/79* (2016.02); *B60J 1/17* (2013.01); *B60J 5/0402* (2013.01); *B60J 10/265* (2016.02); *B60J 10/27* (2016.02)

(58) Field of Classification Search
CPC ........ B60J 10/79; B60J 5/0402; B60J 10/265; B60J 10/27; B60J 1/17
See application file for complete search history.

(56) References Cited

U.S. PATENT DOCUMENTS 4,483,100 A * 11/1984 Blankenburg ........ E05F 11/426
49/352
4,509,293 A * 4/1985 Ufrecht .................. B62D 25/04
49/374
(Continued)

FOREIGN PATENT DOCUMENTS

DE         42 10 035 A1    9/1993
DE    10 2014 005 721 B3    8/2015
(Continued)

OTHER PUBLICATIONS

PCT/EP2016/050919 International Search Report and Written Opinion, Prepared by the European Patent Office, dated Jul. 29, 2016.

*Primary Examiner* — Justin B Rephann
(74) *Attorney, Agent, or Firm* — Fay Sharpe LLP (57) ABSTRACT

A window assembly (170) for a window opening of a motor vehicle comprises a door frame member (22), a movable window pane (130), a window sealing profile (100), and a guiding bracket (150). The movable window pane (130) includes a guiding section (136) and a window section (131) having an outer window surface (132). The window sealing profile (100) is fastened to the door frame member (22) and includes a sealing portion (110, 111, 112, 120) for sealing the window pane (130) against moisture and/or noise. The guiding bracket (150) includes a trimming surface (155) and is configured to guide the window pane (130) along a direction of movement between an open position and a closed position, and vice versa. The guiding bracket (150) simultaneously engages the window sealing profile (100) and the window pane (130), when in the fastened state.

20 Claims, 5 Drawing Sheets

(51) Int. Cl.
   *B60J 1/17*      (2006.01)
   *B60J 5/04*      (2006.01)
   *B60J 10/27*     (2016.01)

(56) References Cited

U.S. PATENT DOCUMENTS

| | | | | |
|---|---|---|---|---|
| 4,591,204 A | * | 5/1986 | Gallitzendoerfer | B60R 13/04 296/146.3 |
| 4,604,830 A | * | 8/1986 | Maeda | B60J 10/248 49/374 |
| 4,608,779 A | * | 9/1986 | Maeda | B60J 10/248 428/122 |
| 4,621,453 A | * | 11/1986 | Watanabe | B60J 10/79 49/227 |
| 4,653,230 A | * | 3/1987 | Seo | B60J 10/79 49/227 |
| 4,691,476 A | * | 9/1987 | Yao | B60J 10/79 49/374 |
| 4,697,386 A | * | 10/1987 | Watanabe | B60J 10/79 49/374 |
| 4,731,951 A | * | 3/1988 | Ikuta | B60J 10/79 296/146.3 |
| 4,874,201 A | * | 10/1989 | Scaglietti | B60J 10/24 296/201 |
| 4,932,712 A | * | 6/1990 | Tomforde | B60R 13/00 296/146.3 |
| 4,970,828 A | * | 11/1990 | Mesnel | B60J 10/79 49/374 |
| 5,086,589 A | * | 2/1992 | dibenedetto | B60J 5/0402 296/146.3 |
| 6,141,910 A | * | 11/2000 | Kobrehel | B60J 5/0402 49/348 |
| 6,572,176 B2 | * | 6/2003 | Davis | B60J 10/78 296/146.16 |
| 6,880,293 B2 | * | 4/2005 | Ishikawa | B60J 1/17 49/414 |
| 8,434,267 B2 | * | 5/2013 | Bocutto | B60J 10/235 296/93 |
| 8,572,898 B2 | * | 11/2013 | Grudzinski | B60J 5/0402 49/441 |
| 8,646,215 B2 | * | 2/2014 | Grudzinski | B60J 1/17 49/441 |
| 8,650,802 B2 | * | 2/2014 | Grudzinski | B60J 5/0402 49/441 |
| 8,701,349 B2 | | 4/2014 | Krause | |
| 8,793,938 B2 | * | 8/2014 | Grudzinski | B60J 1/17 49/441 |
| 9,067,353 B2 | * | 6/2015 | Coldre | B29C 45/1676 |
| 10,167,659 B2 | * | 1/2019 | Sagisaka | B60J 1/17 |
| 2005/0229496 A1 | | 10/2005 | Tashima et al. | |
| 2006/0021282 A1 | * | 2/2006 | Tamaoki | B60J 10/74 49/441 |
| 2008/0224501 A1 | * | 9/2008 | Zimmer | B60J 1/08 296/201 |
| 2012/0025564 A1 | | 2/2012 | Ellis et al. | |
| 2016/0121701 A1 | * | 5/2016 | Yoshida | B60J 1/004 49/372 |
| 2018/0319257 A1 | * | 11/2018 | Krause | B60J 5/0402 |

FOREIGN PATENT DOCUMENTS

| | | |
|---|---|---|
| EP | 1 794 402 B1 | 6/2010 |
| FR | 2 739 060 A1 | 3/1997 |
| IT | 1 211321 | 10/1989 |
| JP | 60 151718 A | 8/1985 |

\* cited by examiner

WINDOW ASSEMBLY, WINDOW PANE, AND WINDOW SEALING PROFILE

This application is the national entry filing of PCT/EP2016/050919 (filed 18 Jan. 2016) as a submission under 35 U.S.C. 371, hereby expressly incorporated herein by reference, and also claims the priority benefit of EP Application Serial No. 15192663.1, filed 2 Nov. 2015, which is also hereby expressly incorporated herein by reference.

The invention generally relates to a window assembly for a motor vehicle. Furthermore, the invention relates to a window pane and a window sealing profile.

In recent years design aspects of motor vehicles have become more important. Yet, from today's perspective also environmental topics are an additional factor to be considered in the development of motor vehicles. Although just in its beginning stages, the electrification of motor vehicles in the near future is posing new challenges regarding, for instance, energy supply, energy storage, and energy consumption. Therefore, there is a constant demand from car manufacturers and their suppliers for solutions to these challenges.

As used herein, terms defining directions or positions, such as "left", "right", "front", "rear", "top", "bottom", "inner", "outer", and the like are referring to a view of a motor vehicle from one of the seats. For example, the B pillar is rear of the A pillar but front of the C pillar. Directions or positions of components are typically designated according to their installed positions. It should further be noted that the term "pillar" as used herein is not limited to the usual load bearing pillar of a motor vehicle. The term "pillar" should rather be construed to further include portions of the motor vehicle in the vicinity of the actual load bearing pillars where accommodating and guiding of the window pane takes place.

EP 2 142 394 B1 discloses a guide arrangement for a movable window pane of a motor vehicle. The guide arrangement includes a first movable window pane, and a second movable window pane. The end face of the first window pane and the end face of the second window pane are arranged opposite, and at a distance from, one another. A first guide part is fastened to the first window pane. A second guide part is fastened to the second window pane. Furthermore, a first receptacle for the first guide part, and a second receptacle for the second guide part are provided.

EP 1 794 402 B1 discloses a division bar assembly to be received between an associated fixed window and an associated movable window of a vehicle. The division bar assembly comprises a support adapted to be secured to the associated fixed window, a guide adapted to be affixed to the associated movable window and adapted to extend from an inner surface thereof, and a guide member extending from the support including a cavity dimensioned to receive the guide.

US 2012/0 025 564 A1 discloses a flush glass system module for a motor vehicle door frame defining a window opening having an upper edge and a lower edge for receiving a window having an inner surface. The flush glass system module comprises a front slider adapted to mount to the inner surface of the window. The first appliqué is disposed entirely on the inner surface side of the window.

DE 10 2005 013 581 B4 discloses a structure of a door window frame of a vehicle having a portion for holding a door window pane. A window pane seal is provided at one end portion of the door window pane. An outer surface of the window seal, an outer surface of the door window pane and an outer surface of an outer wall of the door window frame are flush on the outer side of the vehicle.

DE 10 2014 005 721 B3 discloses a window pane arrangement for a motor vehicle having a window pane. The window pane arrangement comprises a front guiding rail and a rear guiding rail. The window pane is guided in the front guiding rail and the rear guiding rail. At least one of the guiding rails is configured as two-parts having a guiding member and a closure member connected to the guiding member. The guiding member and the closure member define between them a channel for receiving the window pane. The guiding member and the closure member are connected by means of a formfitting connection.

The invention is based on the object to provide a smooth transition from the rim portions of a window pane to the neighboring portions of the vehicle.

The object is achieved by a window assembly according to claim 1. Advantageous embodiments of the window assembly are subject-matter of claims 2 to 14. A window pane for an advantageous window assembly is subject-matter of claim 15. A window sealing profile for an advantageous window assembly is subject-matter of claim 16.

The invention provides a window assembly for a window opening, in particular a side window opening, of a motor vehicle having a front-rear direction. The window assembly comprises a door frame member, a movable window pane, a window sealing profile, and a guiding bracket. A front pillar or a rear pillar are an example for a door frame member, respectively. The movable window pane includes a window section and a guiding section. The window sealing profile includes a mounting portion that is configured to be fastened to the door frame member. The window sealing profile further includes a sealing portion for sealing the window pane. The guiding bracket includes a trimming surface and is configured to guide the window pane along a direction of movement between an open position and a closed position. The guiding bracket is further configured to be fastened to the window sealing profile and to the window pane. When in the fastened state, the guiding bracket simultaneously engages the window sealing profile and the window pane. Preferably, when in the fastened state, the guiding bracket applies an inward directed force so as to press the window pane towards the window sealing profile. In particular, the outer surface and the window outer surface are arranged to be flush. With this configuration a smooth surface of the motor vehicle is possible. In particular the transition between the window pane and the door frame member, such as a front pillar or rear pillar, can be achieved.

In particular, the mounting portion is configured to form-fittingly engage the door frame member. Preferably, the mounting portion is integrally formed as a single unitary member. The mounting portion may include mounting leg. Furthermore, the mounting portion can include a mounting base is connected to the mounting leg. The mounting leg may include a mounting protrusion. The mounting portion may further include a reinforcing member which is preferably embedded in the mounting leg and/or the mounting base. The mounting leg may include a bracket support configured to support a guiding bracket. Alternatively, the mounting leg can have a rear inner bracket support and a front inner bracket support, wherein the rear bracket support is disposed to the rear of the front bracket support. It is also conceivable, that the mounting base includes a bracket support.

The mounting portion may include an inner mounting leg and an outer mounting leg. The inner mounting leg and the outer mounting leg are an example for a mounting leg, respectively. Furthermore, the mounting base preferably connects the inner mounting leg to the outer mounting leg. The mounting protrusion can be disposed at the inner mounting leg and/or the outer mounting leg, preferably at the respective end. The reinforcing member is preferably embedded in the inner mounting leg, the outer mounting leg and/or the mounting base. The mounting portion may comprise a rear inner bracket support, a front inner bracket support, and/or a front bracket support. The rear inner bracket support, the front inner bracket support, and/or the front bracket support are an example for a bracket support, respectively. The rear inner bracket support and additionally or alternatively the outer bracket support may be disposed on the inner mounting leg. It is also conceivable, that the mounting base includes a front bracket support.

Advantageously, the sealing portion comprises a front sealing lip. The front sealing lip is preferably disposed at the mounting leg, in particular at the outer mounting leg. The front sealing lip can protrude outward or away from the mounting leg, in particular from the outer mounting leg. Preferably, the front sealing lip is disposed at the transition between the mounting base and the mounting leg, in particular the transition between the mounting base and the outer mounting leg. The front sealing lip may engage the window pane. The front sealing lip is preferably interposed between the guiding bracket and the door frame member. The front sealing lip can have a front sealing surface, an example for a sealing surface, coated with lubricant varnish or flock. The sealing portion can include a rear sealing lip. The rear sealing lip can protrude outward from the mounting leg, in particular from the outer mounting leg. Preferably, the rear sealing lip is disposed at the free end of the mounting leg, in particular at the free end of the outer mounting leg. The rear sealing lip may engage the window pane. The rear sealing lip is preferably interposed between the guiding bracket and the door frame member. The rear sealing lip can have a rear sealing surface, an example for a sealing surface, coated with lubricant varnish or flock. In a preferred embodiment, the front sealing lip is disposed to the front, whereas the rear sealing lip is disposed to the rear. The sealing portion can include an inner sealing bulge. The inner sealing bulge can protrude outward from the mounting leg, in particular from the outer mounting leg. Preferably, the inner sealing bulge is disposed at the center of the mounting leg, in particular at the center of the outer mounting leg. The inner sealing bulge may engage the window pane. The inner sealing bulge is preferably interposed between the guiding bracket and the door frame member. The inner sealing bulge can have a bulge sealing surface, an example for a sealing surface, coated with lubricant varnish or flock. In a preferred embodiment, the inner sealing bulge is interposed between the front sealing lip and the rear sealing lip. The sealing portion may comprise an intermediate sealing member. The intermediate sealing member can be a separate member. The intermediate sealing member can be disposed on the door frame member, in particular on the front pillar and/or on the rear pillar. More preferred, the intermediate sealing member is interposed between the fastening leg and the outer leg. Most preferred, the intermediate sealing member is disposed on the base leg. The intermediate sealing member can include a front contact surface, a rear contact surface, and an exposed surface interposed between the front contact surface and the rear contact surface. The front contact surface and/or the rear contact surface may be coated with lubricating varnish or flock. The exposed surface is preferably arranged to be flush with the outer surface and the outer window surface. Additionally or alternatively, the exposed surface may be arranged to be flush with the outer surface and the outer window surface. With this configuration, a moisture seal and/or an acoustic seal can be provided.

The window pane may comprise a window section and a guiding section which are integrally formed as a single unitary member. The window pane is preferably made of a transparent thermoplastic like polycarbonate or polymethyl methacrylate (PMMA), for example. The guiding section may include a supporting portion. The guiding section can include a guiding arm. The guiding section also may comprise a connecting arm connecting the window section and the guiding arm. The guiding section can include a reinforcing member, which is advantageously embedded in the guiding arm and/or the connecting arm. Preferably, the guiding section extends along between 50% and 100%, in particular between 70% and 100%, of a dimension of the window section. The guiding section can comprise a guiding surface being configured to contact the guiding member. Preferably, the guiding section comprises a receiving opening. The receiving opening can be defined by the guiding surface. Preferably the receiving opening extends in a receiving direction which is parallel to the front-rear direction.

The guiding bracket may include a fastening limb, an intermediate limb, and a guiding limb. The intermediate limb preferably connects the fastening limb to the guiding limb. It is preferred that the fastening limb, the guiding limb, and the intermediate limb cooperate, in particular are disposed, in such a way, that the inward directed force is generated due to bending of the fastening limb and/or the guiding limb relative to the intermediate limb, respectively. The fastening limb, the intermediate limb, and the guiding limb are preferably integrally formed as a unitary member using a thermoplastic or a metal like aluminum. The fastening limb, the intermediate limb, and the guiding limb may be arranged in a C-like shape. The fastening limb may include a fastening hook. The guiding bracket may be provided with a separate guiding member. The guiding member is preferably disposed at the end of the guiding limb. The guiding member may have a guiding support being configured to support the window pane. It is preferred that the guiding member is received in the receiving opening. Preferably, the guiding member supports the guiding section in a sliding manner. In an advantageous embodiment, the guiding member is made from a lubricant material, e.g. polyethylene. Alternatively or additionally, the guiding member can be coated with a lubricant varnish or flock.

The invention further provides a window pane for an advantageous embodiment of a window assembly. The window pane may include any combination of features relating to the window pane as previously described. Preferably, a window pane for an advantageous embodiment of a window assembly comprises a window section and a guiding section being configured to cooperate with a guiding bracket. The window section and the guiding section are integrally formed as a single unitary member.

The invention further provides a window sealing profile. The window sealing profile may include any combination of features relating to the window sealing profile as previously described. Particularly, a window sealing profile for a an advantageous window assembly comprises a mounting portion and a sealing portion. The mounting portion is configured to mount the window sealing profile to the door frame member. The mounting portion includes an inner mounting leg, an outer mounting leg, and a mounting base which connects the inner mounting leg to the outer mounting leg. The sealing portion is configured to seal a window pane. The sealing portion includes a front sealing lip disposed at the transition between the inner mounting leg and the mounting base. It is suggested, that the sealing portion comprises an inner sealing bulge disposed separate from and to the rear relative to the front sealing lip. Alternatively it is suggested that the sealing portion comprises an inner sealing lip disposed at the transition between the inner mounting leg and the mounting base.

The invention further provides a vehicle door comprising any of the previous described advantageous embodiments of a window assembly, a window pane, or a window sealing profile. Still further, the invention provides a vehicle comprising an advantageous embodiment of a vehicle door, a window assembly, a window pane, or a window sealing profile.

Further details and advantageous effects of the invention will become apparent in the following detailed description and on the basis of the attached schematic drawings. The figures are listed below.

Figure 1:
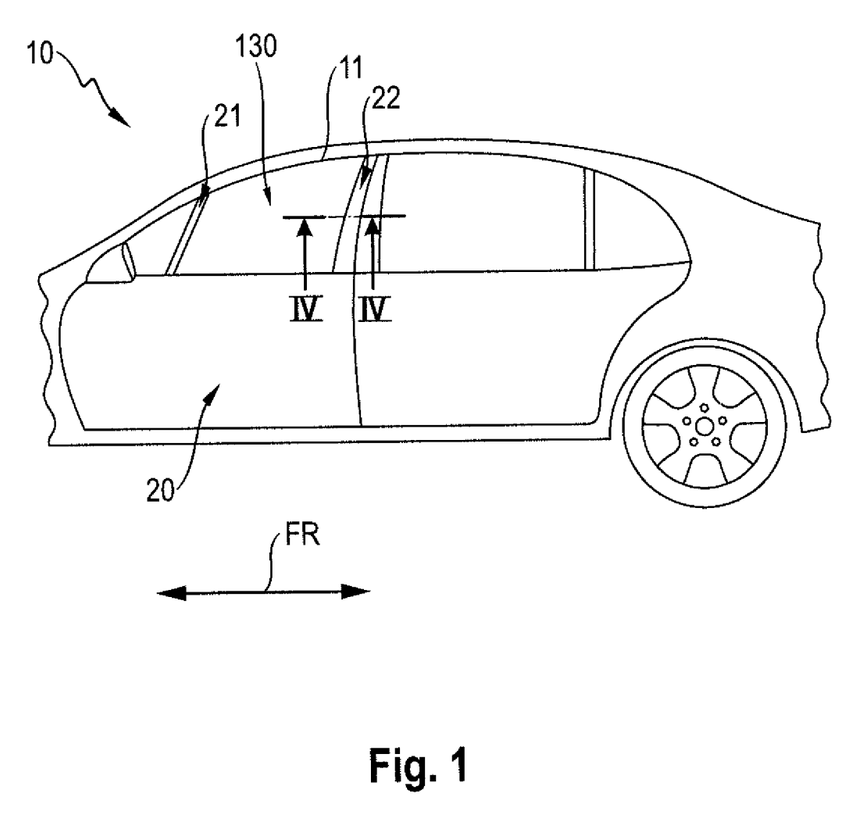
FIG. 1 depicts a partial view of an embodiment of a motor vehicle.

Referring to FIG. 1, a motor vehicle 10 comprises a front-rear direction FR and a side window opening 11 extending along the front-rear direction FR. The motor vehicle 10 further comprises a vehicle door 20 having a front pillar 21 and a rear pillar 22. The front pillar 21 is disposed towards the front of the vehicle door 20, whereas the rear pillar 22 is disposed towards the rear of the vehicle door 20. It should be noted, that the front pillar 21 and the rear pillar 22 need not be a load bearing structure. The front pillar 21 and the rear pillar 22 are an example for a door frame member, respectively.

Figure 2:
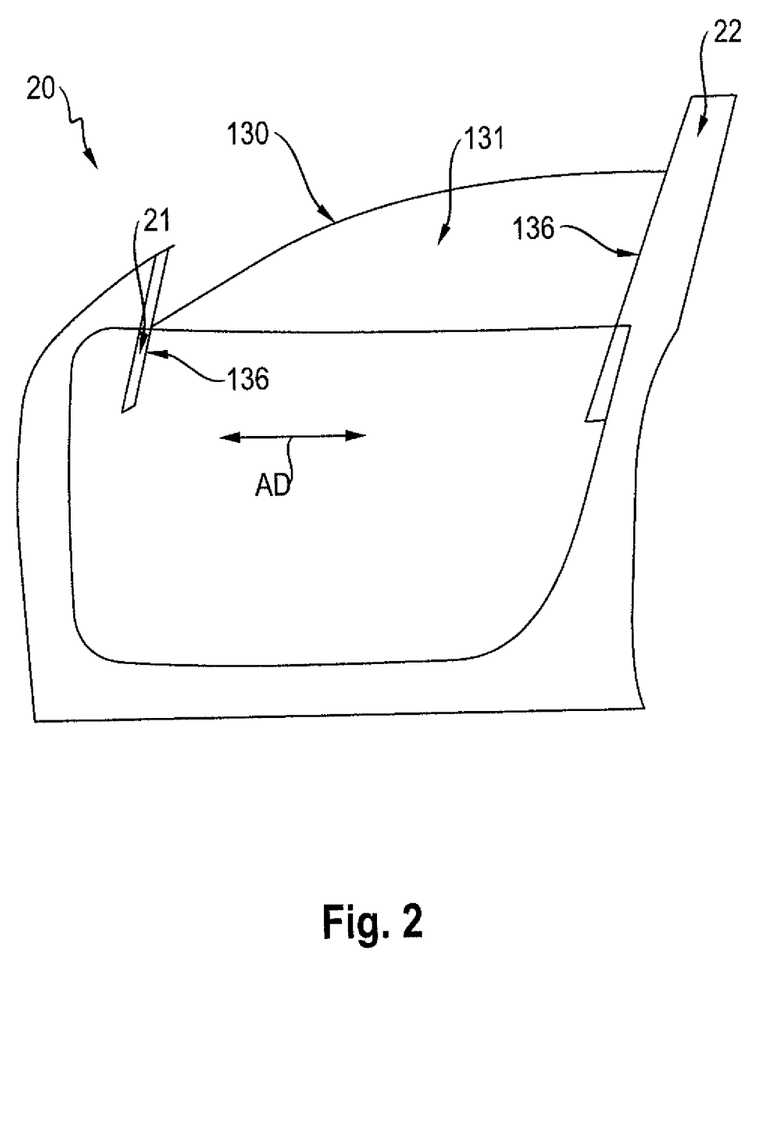
FIG. 2 depicts a schematic view of an embodiment of a vehicle door.
Figure 3:
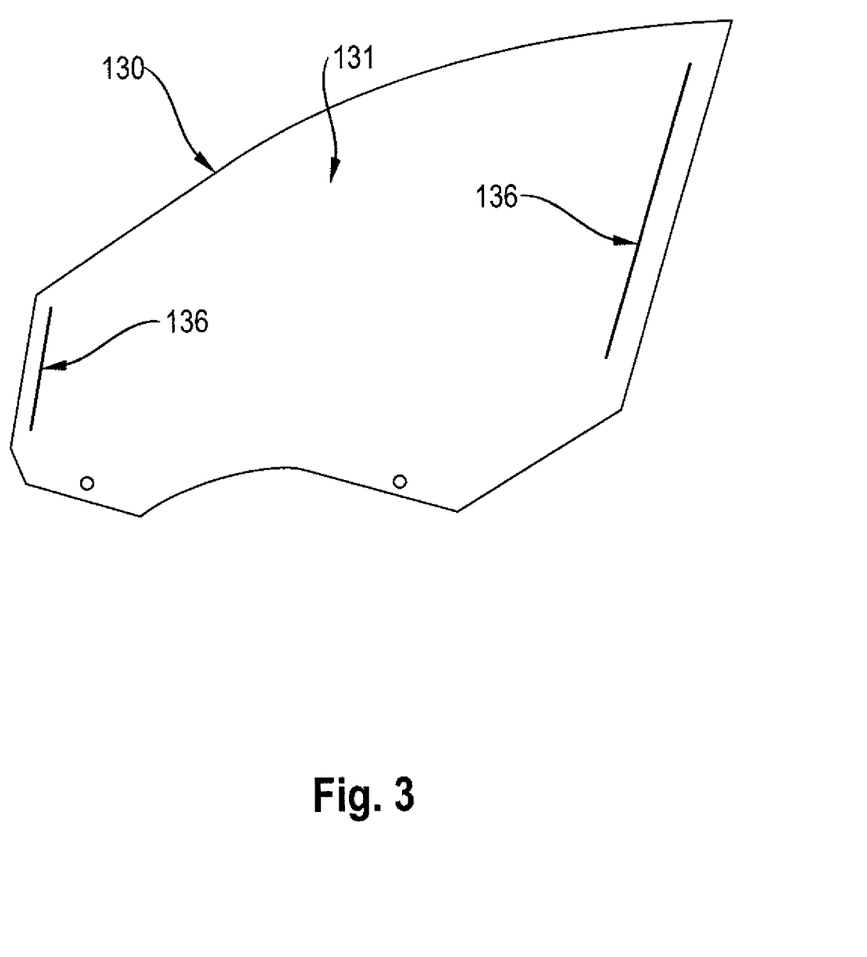
FIG. 3 depicts a schematic view of an embodiment of a window pane.

Referring now to FIG. 1 and FIG. 2, the vehicle door 20 comprises a window pane 130. The window pane 130 is partially arranged within the front pillar 21 and the rear pillar 22 in order to guide the window pane 130, when opening or closing. The window pane 130 comprises a window section 131 which is usually transparent. The term transparent shall be construed to include a configuration wherein the window section 131 serves as a protection against sunlight. As seen in more detail in FIG. 3, the window pane 130 includes a guiding section 136 which allows to guide the window pane 130, when opening or closing.

Figure 4:
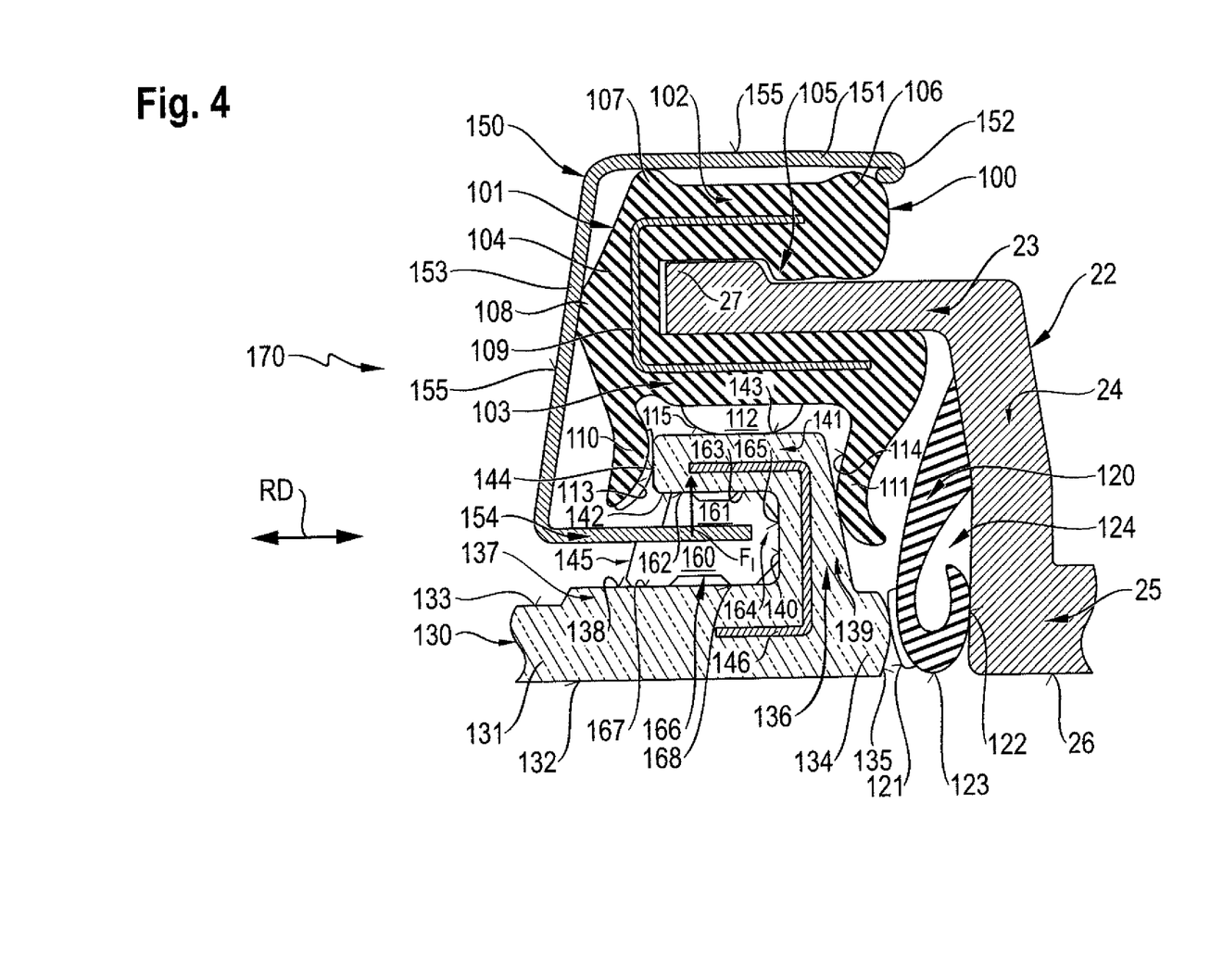
FIG. 4 depicts a cross-section of a first embodiment of a window assembly along IV-IV of FIG. 1.

Referring now to FIG. 4, a first embodiment of a window assembly 170 will be described with reference to the rear pillar 22 serving as the door frame member. It should be noted, that in the first embodiment and in all subsequently described embodiments, the front pillar 21 may additionally or alternatively serve as the door frame member.

The window assembly 170 comprises a rear pillar 22, a window sealing profile 100, a window pane 130, and a guiding bracket 150. The rear pillar 22 comprises a fastening leg 23, a base leg 24, and an outer leg 25 having an outer surface 26. The fastening leg 23 has provided at its end a mounting protrusion 27. The base leg 24 connects the fastening leg 23 to the outer leg 25. The fastening leg 23, the outer leg 24, and the base leg 25 are arranged step-like.

The window sealing profile 100 includes a mounting portion 101 being configured to be fastened to the rear pillar 22. The mounting portion 101 is integrally formed as a single unitary member. The mounting portion 101 comprises an inner mounting leg 102, an outer mounting leg 103, and a mounting base 104. The inner mounting leg 102 and the outer mounting leg 103 are an example for a mounting leg, respectively. The inner mounting leg 102 has provided at its end a mounting protrusion 105. Adjacent to the mounting protrusion 105 a rear inner bracket support 106 is provided. The mounting base 104 connects the inner mounting leg 102 to the outer mounting leg 103. At the transition between the inner mounting leg 102 and the mounting base 104 a front inner bracket support 107 is provided. The rear inner bracket support 106 and the front inner bracket support 107 are an example for a bracket support, respectively. The rear inner bracket support 106 is disposed to the rear of the front inner bracket support. 107. A front bracket support 108, which is also an example for a bracket support, is disposed roughly in the center of the mounting base 104.

The outer mounting leg 103 comprises a front sealing lip 110, a rear sealing lip 111, and an inner sealing bulge 112. The front sealing lip 110, the rear sealing lip 111, and the inner sealing bulge 112 are an example for a sealing portion, respectively. The front sealing lip 110 is disposed at the transition between the outer mounting leg 103 and the mounting base 104. The front sealing lip 110 protrudes with an angle between 80° and 110°, preferably orthogonally, away from the outer mounting leg 103 and outward. The front sealing lip 110 comprises a front sealing surface 113 facing to the rear and being coated with flock. The rear sealing lip 111 is disposed at the end of the outer mounting leg 103. The rear sealing lip 111 protrudes with an angle between 80° and 110°, preferably orthogonally, away from the outer mounting leg 103 and outward. The rear sealing lip 111 comprises a rear sealing surface 114 facing to the front and being coated with lubricant varnish. The inner sealing bulge 112 is interposed between the front sealing lip 110 and the rear sealing lip 111. The inner sealing bulge 112 protrudes away from the outer mounting leg 103 and outward. The inner sealing bulge 112 roughly takes an (semi-)elliptical cross-section. The inner sealing bulge 112 comprises a bulge sealing surface 115 facing outward and being coated with lubricant varnish. The front sealing surface 113, the rear sealing surface 114 and the bulge sealing surface 115 are an example for a sealing surface, respectively.

The window sealing profile 100 further comprises an intermediate sealing member 120. The intermediate sealing member 120 is an example for a sealing portion. The intermediate sealing member 120 is disposed at rear pillar 22. The intermediate sealing member 120 protrudes from the base leg 24 outward and subsequently bends back to form a cavity 124. The cavity 124 is cooperatively defined by the intermediate sealing member 120 and the base leg 24. The intermediate sealing member 120 includes a front contact surface 121, a rear contact surface 122, and an exposed surface 123. The front contact surface 121 and the rear contact surface 122 are another example for a sealing surface, respectively. The front contact surface 121 is coated with flock, whereas the rear contact surface 122 is uncoated. The exposed surface 123 is facing outward and is interposed between the front contact surface 121 and the rear contact surface 122.

Referring to FIGS. 1 to 4, the window pane 130 comprises a window section 131 and a guiding section 136. The window section 131 and the guiding section 136 are integrally formed as a single unitary member. The window section 131 is substantially transparent. The window section 131 comprises an outer window surface 132, an inner window surface 133, and an end portion 134 including an end face 135. The end face 135 is configured to contact the intermediate sealing member 120.

The guiding section 136 comprises a connecting arm 132, a guiding arm 141, and a supporting portion 137. The supporting portion 137 is disposed on the side of the inner window surface 133 and has a step-like shape. The connecting arm 132 is disposed adjacent the end portion 134 and protrudes from the supporting portion 137, roughly orthogonal to the window section 131, and inward. The connecting arm 139 subsequently transitions into the guiding arm 141 which extends substantially in parallel to the window section 131 and to the front. The connecting arm 132, the guiding arm 141 and the supporting portion 137 define a receiving opening 145. A reinforcing member 146 is embedded in the connecting arm 132, in the guiding arm 141, and in the supporting portion 137. The reinforcing member 146 is substantially U-shaped and made of metal, such as steel or aluminium. The receiving opening 145 extends along a receiving direction RD, which is parallel to the front-rear direction FR. The supporting portion 137 includes a supporting surface 138 facing inward. The connecting arm 139 includes a connecting surface 140 facing forward. The guiding arm 141 includes an inner guiding surface 142 facing inward, an outer guiding surface 143 facing outward, and a front guiding surface 144 facing to the front. The supporting surface 138, the connecting surface 140, the inner guiding surface 142, the outer guiding surface 143, and the front guiding surface 144 are examples for a guiding surface, respectively. With this embodiment, the guiding surfaces are uncoated.

The guiding bracket 150 includes a fastening limb 151, an intermediate limb 153, and a guiding limb 154. The fastening limb 151, the intermediate limb 153, and the guiding limb 154 are roughly arranged in a C-shape. The fastening limb 151 has provided at its end a fastening hook 152. The intermediate limb 153 connects the fastening limb 151 to the guiding limb 154. Thereby, the fastening limb 151 and the guiding limb 154, when displaced, generate a force due to bending elasticity, respectively. The guiding bracket 150 comprises a trimming surface 155 extending at least over the fastening limb 151 and the intermediate limb 153. The fastening limb 151, the intermediate limb 153, and the guiding limb 154 are integrally formed as a single unitary member and made of a thermoplastic or a metal, such as steel or aluminium.

The guiding bracket 150 further comprises a guiding member 160. The guiding member 160 is disposed at the end of the guiding limb 154. The guiding member 160 includes an inner guiding part 161, a rear guiding part 164, and an outer guiding part 166. The inner guiding part 161 extends parallel to the guiding limb 154 and to the front. The inner guiding part 161 is disposed inward relative to the outer guiding part 166. The rear guiding part 164 connects the inner guiding part 161 to the outer guiding part 166. The rear guiding part 164 is disposed to the rear relative to the inner guiding part 161 and the outer guiding part 166. The outer guiding part 166 extends parallel to the guiding limb 154 and to the front. The outer guiding part 166 is disposed outward relative to the inner guiding part 161.

The inner guiding part 161 comprises an inner front guiding support 162 and an inner rear guiding support 163. The inner front guiding support 162 and the inner rear guiding support 163 are an example for a guiding support, respectively. The inner front guiding support 162 protrudes from the inner guiding part 161 and inward. The inner front guiding support 162 is disposed at the end of the inner guiding part 161. The inner rear guiding support 163 protrudes from the inner guiding part 161 and inward. The inner rear guiding support 163 is disposed at the transition of the inner guiding part 161 to the rear guiding part 164. The inner front guiding support 162 and the inner rear guiding support 163 are spaced apart from each other in the receiving direction RD. The rear guiding part 164 comprises a rear guiding support 165. The rear guiding support 165 is an example for a guiding support. The rear guiding support 165 protrudes from the rear guiding part 164 and to the rear. The rear guiding support 165 is preferably disposed roughly at the center of the rear guiding part 164. The outer guiding part 166 comprises an outer front guiding support 167 and an outer rear guiding support 168. The outer front guiding support 167 and the outer rear guiding support 168 are an example for a guiding support, respectively. The outer front guiding support 167 protrudes from the outer guiding part 166 and inward. The outer front guiding support 167 is disposed at the end of the outer guiding part 166. The outer rear guiding support 168 protrudes from the outer guiding part 166 and inward. The outer rear guiding support 168 is disposed at the transition of the outer guiding part 166 to the rear guiding part 164. The outer front guiding support 167 and the outer rear guiding support 168 are spaced apart from each other in the receiving direction RD.

Referring now to FIG. 4, the assembled state of the window assembly 170 is described. The window sealing profile 100 is fastened to the rear pillar 22. The mounting portion 101 is pushed onto the fastening leg 23, wherein the fastening protrusion 27 and the mounting protrusion 105 form-fittingly engage each other. Furthermore, the window sealing profile 100 and the window pane 130 are arranged so that the sealing portion engages the window pane 130. The intermediate sealing member 120 is formed to the base leg 24. The intermediate sealing member 120 engages the end portion 134. The rear contact surface 122 engages the outer leg 25 and the front contact surface 121 engages the end face 135. The front sealing lip 110, the rear sealing lip 111, and the inner sealing bulge 112 engage the guiding section 136. Specifically, the front sealing lip 110 and the inner sealing bulge 112 engage the guiding arm 141, whereas the rear sealing lip 111 engages the connecting arm 139. In particular, the front sealing lip 110 engages the front guiding surface 144 and the inner sealing bulge 112 engages the inner guiding surface 142. The guiding bracket 150 is fastened to the window sealing profile 100 so that the bracket supports are engaging and supporting the guiding bracket 150. The guiding member 160 is disposed in the receiving opening 145 and slidingly engages the guiding section 136, in particular the connecting arm 139, the guiding arm 141, and the supporting portion 137. Specifically, the inner guiding part 161 engages the guiding arm 141, the rear guiding part 164 engages the connecting arm 139 and the outer guiding part 166 engages the supporting portion 137. The outer surface 26, the exposed surface 123, and the outer window surface 132 are flush.

The window assembly 170 is assembled by providing a rear pillar 22 having the intermediate sealing member 120. Subsequently, the window sealing profile 100 is fastened to the rear pillar 22. Next, the window pane 130 is arranged in engagement with the window sealing profile 100. Finally, the guiding bracket 150 is fastened so as to engage both the window sealing profile 100 and the window pane 130. The window pane 130 is now guided by the guiding bracket 150 during movement between the open position and the closed position, and vice versa.

For the sake of brevity, further embodiments of the window assembly and its components are described only insofar, as they differ from the first embodiment.

Figure 5:
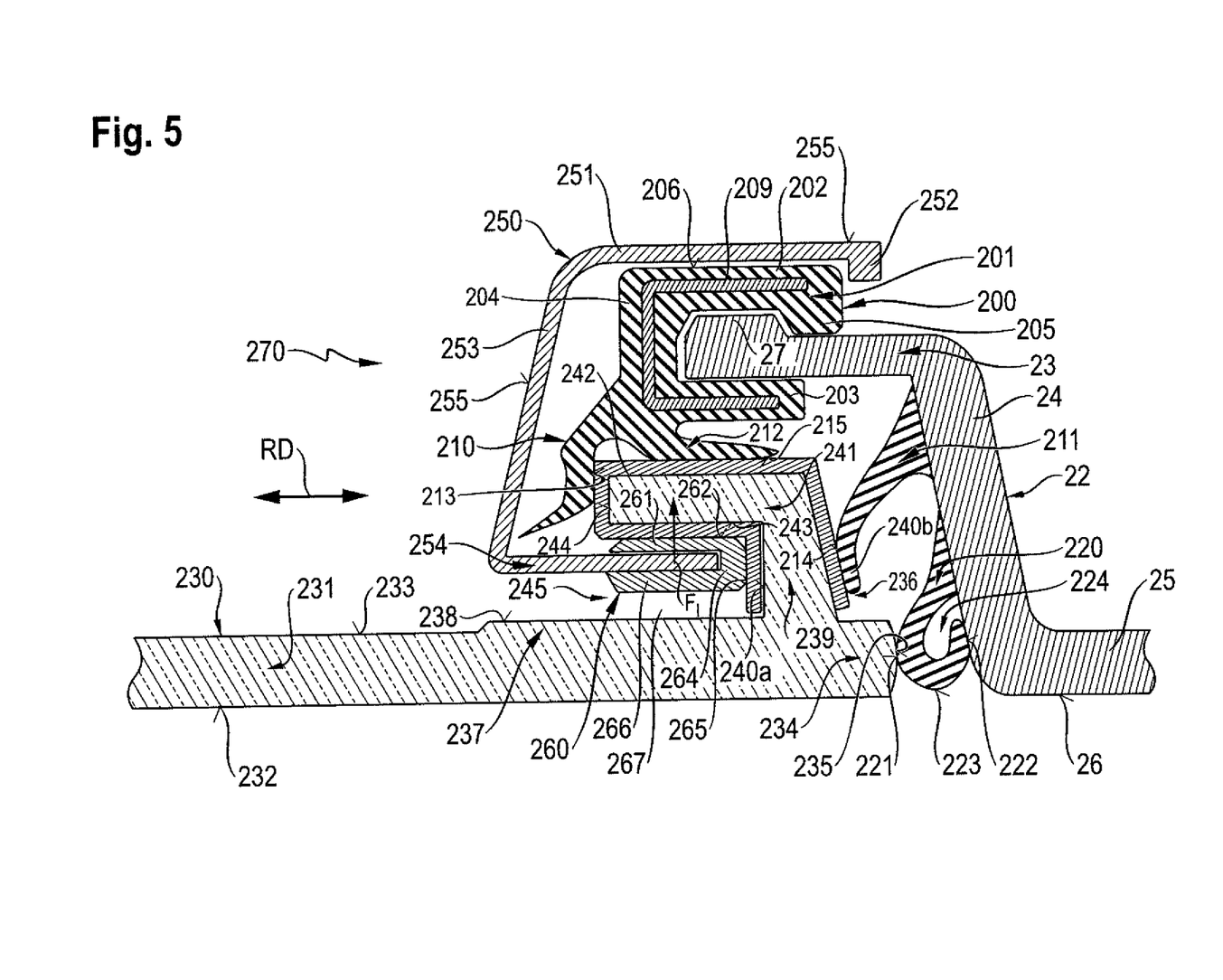
FIG. 5 depicts a cross-section of a second embodiment of a window assembly.

Referring now to FIG. 5, a second embodiment of a window assembly 270 will be described with reference to the rear pillar 22 serving as the door frame member. It should be noted, that in the first embodiment and in all subsequently described embodiments, the front pillar 21 may additionally or alternatively serve as the door frame member.

The window assembly 270 comprises the rear pillar 22, a window sealing profile 200, a window pane 230, and a guiding bracket 250. The window sealing profile 200 includes a mounting portion 201 being configured to be fastened to the rear pillar 22. The mounting portion 201 is integrally formed as a single unitary member. The mounting portion 201 comprises an inner mounting leg 202, an outer mounting leg 203, and a mounting base 204. The inner mounting leg 202 and the outer mounting leg 203 are an example for a mounting leg, respectively. The inner mounting leg 202 has provided at its end a mounting protrusion 205. Adjacent to the mounting protrusion 205 an inner bracket support 206 is provided. The mounting base 204 connects the inner mounting leg 202 to the outer mounting leg 203. The inner bracket support 206 extends over the entire inner mounting leg 202.

The outer mounting leg 203 comprises a front sealing lip 210, and an inner sealing lip 212. The front sealing lip 210, and the inner sealing lip 212 are an example for a sealing portion, respectively. The front sealing lip 210 is disposed at the transition between the outer mounting leg 203 and the mounting base 204. The front sealing lip 210 protrudes in a zig-zag pattern away from the outer mounting leg 203 and outward. The front sealing lip 210 comprises a front sealing surface 213 facing to the rear and being coated with lubricant varnish. The inner sealing lip 212 is disposed adjacent to the front sealing lip 210. The inner sealing lip 112 protrudes away from the outer mounting leg 203 with an angle between 30° and 60°, preferably with an angle of about 45°, to the rear and outward. The inner sealing lip 212 comprises an inner surface 215 facing outward and being coated with lubricant varnish. The front sealing surface 213 and the bulge sealing surface 215 are an example for a sealing surface, respectively.

The window sealing profile 100 further comprises a rear sealing lip 211 and an intermediate sealing member 220. The rear sealing lip 211 and the intermediate sealing member 220 are an example for a sealing portion, respectively. The intermediate sealing member 220 is disposed at rear pillar 22. The intermediate sealing member 220 protrudes from the base leg 24 outward and subsequently bends back to form a cavity 224. The cavity 224 is cooperatively defined by the intermediate sealing member 220 and the base leg 24. The intermediate sealing member 220 includes a front contact surface 221, a rear contact surface 222, and an exposed surface 223. The front contact surface 221 and the rear contact surface 222 are another example for a sealing surface, respectively. The front contact surface 221 and the rear contact surface 222 are coated with lubricant varnish. The exposed surface 223 is facing outward and is interposed between the front contact surface 221 and the rear contact surface 222. The rear sealing lip 211 is disposed at the rear pillar 22. The rear sealing lip 211 protrudes from the base leg 24 and outward. The rear sealing lip 211 comprises a rear sealing surface 214 facing to the front and being coated with lubricant varnish. The rear sealing surface 214 is an example for a sealing surface Still referring to FIG. 5, the window pane 230 comprises a window section 231 and a guiding section 236. The window section 231 and the guiding section 236 are integrally formed as a single unitary member. The window section 231 is substantially transparent. The window section 231 comprises an outer window surface 232, an inner window surface 233, and an end portion 234 including an end face 235. The end face 235 is configured to contact the intermediate sealing member 220.

The guiding section 236 comprises a connecting arm 232, a guiding arm 241, and a supporting portion 237. The supporting portion 237 is disposed on the side of the inner window surface 233 and has a step-like shape. The connecting arm 232 is disposed adjacent the end portion 234 and protrudes from the supporting portion 237, roughly orthogonal to the window section 231, and inward. The connecting arm 239 subsequently transitions into the guiding arm 241 which extends substantially in parallel to the window section 231 and to the front. The connecting arm 232, the guiding arm 241 and the supporting portion 237 define a receiving opening 245. The receiving opening 245 extends along a receiving direction RD, which is parallel to the front-rear direction FR. The supporting portion 237 includes a supporting surface 238 facing inward. The connecting arm 239 includes a front connecting surface 240a facing forward and a rear connecting surface 240b facing rearward. The guiding arm 241 includes an inner guiding surface 242 facing inward, an outer guiding surface 243 facing outward, and a front guiding surface 244 facing to the front. The supporting surface 238, the connecting surface 240, the inner guiding surface 242, the outer guiding surface 243, and the front guiding surface 244 are coated with lubricating varnish. The supporting surface 238, the connecting surface 240, the inner guiding surface 242, the outer guiding surface 243, and the front guiding surface 244 are examples for a guiding surface, respectively.

The guiding bracket 250 includes a fastening limb 251, an intermediate limb 253, and a guiding limb 254. The fastening limb 251, the intermediate limb 253, and the guiding limb 254 are roughly arranged in a C-shape. The fastening limb 251 has provided at its end a fastening hook 252. The intermediate limb 253 connects the fastening limb 251 to the guiding limb 254. Thereby, the fastening limb 251 and the guiding limb 254, when displaced, generate a force due to bending elasticity, respectively. The guiding bracket 250 comprises a trimming surface 255 extending at least over the fastening limb 251 and the intermediate limb 253. The fastening limb 251, the intermediate limb 253, and the guiding limb 254 are integrally formed as a single unitary member and made of a thermoplastic or a metal, such as steel or aluminium.

The guiding bracket 250 further comprises a guiding member 260. The guiding member 260 is disposed at the end of the guiding limb 254. The guiding member 260 includes an inner guiding part 261, a rear guiding part 264, and an outer guiding part 266. The inner guiding part 261 extends parallel to the guiding limb 254 and to the front. The inner guiding part 261 is disposed inward relative to the outer guiding part 266. The rear guiding part 264 connects the inner guiding part 261 to the outer guiding part 266. The rear guiding part 264 is disposed to the rear relative to the inner guiding part 261 and the outer guiding part 266. The outer guiding part 266 extends parallel to the guiding limb 254 and to the front. The outer guiding part 266 is disposed outward relative to the inner guiding part 261. The inner guiding part 261 comprises an inner guiding support 262 which is an example for a guiding support. The rear guiding part 264 comprises a rear guiding support 265. The rear guiding support 265 is an example for a guiding support.

Still referring now to FIG. 5, the assembled state of the window assembly 270 is described. The window sealing profile 200 is fastened to the rear pillar 22. The mounting portion 201 is pushed onto the fastening leg 23, wherein the fastening protrusion 27 and the mounting protrusion 205 form-fittingly engage each other. Furthermore, the window sealing profile 200 and the window pane 230 are arranged so that the sealing portion engages the window pane 230. The intermediate sealing member 220 is formed to the base leg 24. The intermediate sealing member 220 engages the end portion 234. Specifically, the rear contact surface 222 engages the outer leg 25. The window pane 230 is arranged so that the end face 235 engages the front contact surface 221. The rear sealing lip 211 is formed to the base leg 24 and engages the guiding section 236. Specifically, the rear sealing lip 211 engages the connecting arm 239. More specifically, the rear sealing lip 211 engages the rear connecting surface 240*b*. Furthermore, the front sealing lip 210 and the inner sealing lip 212 engage the guiding section 236. More specifically, the front sealing lip 210 and the inner sealing bulge 212 engage the guiding arm 241. The front sealing lip 210 preferably engages the front guiding surface 244, whereas the inner sealing lip 212 engages the inner guiding surface 242. The guiding bracket 250 is fastened to the window sealing profile 200 so that the inner bracket support 206 engages and supports the guiding bracket 250. The guiding member 260 is disposed in the receiving opening 245 and slidingly engages the guiding section 236, in particular the connecting arm 239 and the guiding arm 241. The guiding member 260 and the supporting portion 237 cooperatively define a gap 267. Specifically, the inner guiding part 261 engages the guiding arm 241 and the rear guiding part 264 engages the connecting arm 139.

The window assembly 270 is assembled by providing a rear pillar 22 having the rear sealing lip 211 and the intermediate sealing member 220. Subsequently, the window sealing profile 200 is fastened to the rear pillar 22. Next, the window pane 230 is arranged in engagement with the window sealing profile 200. Finally, the guiding bracket 250 is fastened so as to engage both the window sealing profile 200 and the window pane 230. The window pane 230 is now guided by the guiding bracket 250 during movement between the open position and the closed position, and vice versa.

LIST OF REFERENCE SIGNS 10 motor vehicle
11 side window opening
20 vehicle door
21 front pillar (door frame member)
22 rear pillar (door frame member)
23 fastening leg
24 base leg
25 outer leg
26 outer surface
27 fastening protrusion
100 window sealing profile
101 mounting portion
102 inner mounting leg (mounting leg)
103 outer mounting leg (mounting leg)
104 mounting base
105 mounting protrusion
106 rear inner bracket support (bracket support)
107 front inner bracket support (bracket support)
108 front bracket support (bracket support)
109 reinforcing member
110 front sealing lip (sealing portion)
111 rear sealing lip (sealing portion)
112 inner sealing bulge (sealing portion)
113 front sealing surface (sealing surface)
114 rear sealing surface (sealing surface)
115 bulge sealing surface (sealing surface)
120 intermediate sealing member (sealing portion)
121 front contact surface (sealing surface)
122 rear sealing surface (sealing surface)
123 exposed surface
124 cavity
130 window pane
131 window section
132 outer window surface
133 inner window surface
134 end portion
135 end face
136 guiding section
137 supporting portion
138 support surface (guiding surface)
139 connecting arm
140 connecting surface (guiding surface)
141 guiding arm
142 inner guiding surface (guiding surface)
143 outer guiding surface (guiding surface)
144 front guiding surface (guiding surface)
145 receiving opening
146 reinforcing member
150 guiding bracket
151 fastening limb
152 fastening hook
153 intermediate limb
154 guiding limb
155 trimming surface
160 guiding member
161 inner guiding part
162 inner front guiding support (guiding support)
163 inner rear guiding support (guiding support)
164 rear guiding part
165 rear guiding support (guiding support)
166 outer guiding part
167 outer front guiding support (guiding support)
168 outer rear guiding support (guiding support)
170 window assembly
200 window sealing profile
201 mounting portion
202 inner mounting leg
203 outer mounting leg
204 mounting base
205 mounting protrusion
206 inner bracket support (bracket support)
209 reinforcing member
210 front sealing lip (sealing portion)
211 rear sealing lip (sealing portion)
212 inner sealing lip (sealing portion)
213 front sealing surface (sealing surface)
214 rear sealing surface (sealing surface)
215 inner sealing surface (sealing surface)
220 intermediate sealing member (sealing portion)
221 front contact surface (sealing surface)
222 rear sealing surface (sealing surface)
223 exposed surface
224 cavity
230 window pane
231 window section 232 outer window surface
233 inner window surface
234 end portion
235 end face
236 guiding section
237 supporting portion
238 support surface
239 connecting arm
240a front connecting surface (guiding surface)
240b rear connecting surface (guiding surface)
241 guiding arm
242 inner guiding surface (guiding surface)
243 outer guiding surface (guiding surface)
244 front guiding surface (guiding surface)
245 receiving opening
250 guiding bracket
251 fastening limb
252 fastening hook
253 intermediate limb
254 guiding limb
255 trimming surface
260 guiding member
261 inner guiding part
262 inner guiding support (guiding support)
264 rear guiding part
265 rear guiding support (guiding support)
266 outer guiding part
267 gap
270 window assembly
FR front-rear direction
RD receiving direction
$F_I$ inward directed force

The invention claimed is:

1. Window assembly for a window opening of a motor vehicle having a front-rear direction, comprising:
    a door frame member having an outer surface;
    a movable window pane having a guiding section, and a window section including a window outer surface, the guiding section comprising a guiding surface;
    a window sealing profile including a mounting portion that is fastened to the door frame member, and having a sealing portion being configured to seal the window pane, the mounting portion comprising a mounting leg and a mounting base that is connected to the mounting leg, one of the mounting leg or the mounting base having a bracket support configured to support a guiding bracket; and
    the guiding bracket having a surface being configured to guide the window pane along a direction of movement between an open position and a closed position, the guiding bracket being further configured in a fastened state to be fastened to the window sealing profile and to the window pane,
    wherein the guiding bracket, when in the fastened state, is simultaneously engaging the window sealing profile and the window pane;
    wherein the guiding bracket, when in the fastened state, is configured to apply an inward directed force ($F_1$) so as to press the window pane towards the window sealing profile;
    the guiding bracket comprises a fastening limb, a guiding limb, and an intermediate limb connecting the fastening limb to the guiding limb;
    wherein the guiding bracket comprises a guiding member, wherein the guiding surface of the guiding section is configured to contact the guiding member, the guiding member being disposed at the end of the guiding limb;
    wherein the guiding section comprises a receiving opening being defined by the guiding surface and extending in a receiving direction (RD) which is parallel to the front-rear direction (FR); and,
    wherein the guiding member, when in the fastened state, is received in the receiving opening and is supporting the guiding section in a sliding manner.

2. Window assembly according to claim 1, wherein the outer surface and the window outer surface are arranged to be flush.

3. Window assembly according to claim 2 wherein the fastening limb, the guiding limb, and the intermediate limb cooperate in such a way, that the inward directed force is generated due to bending of one of the fastening limb and the guiding limb relative to the intermediate limb, respectively.

4. Window assembly according to claim 2, wherein the guiding member comprises a guiding support being configured to support the window pane.

5. Window assembly according to claim 2 wherein the sealing portion comprises an intermediate sealing member having a front contact surface engaging the window pane, and having a rear contact surface engaging the door frame member.

6. Window assembly according to claim 1 wherein the fastening limb, the guiding limb, and the intermediate limb cooperate in such a way, that the inward directed force is generated due to bending of one of the fastening limb and the guiding limb relative to the intermediate limb, respectively.

7. Window assembly according to claim 6, wherein the guiding member comprises a guiding support being configured to support the window pane.

8. Window assembly according to claim 1, wherein the guiding member comprises a guiding support being configured to support the window pane.

9. Window assembly according to claim 8, wherein the sealing portion comprises an intermediate sealing member having a front contact surface engaging the window pane, and having a rear contact surface engaging the door frame member.

10. Window assembly according to claim 9, wherein the intermediate sealing member further comprises an exposed surface interposed between the front contact surface and the rear contact surface,
    wherein the exposed surface is arranged to be one of flush with and recessed relative to the outer surface and the outer window surface.

11. Window assembly according to claim 9 wherein the window pane comprises an end face engaging the intermediate sealing member.

12. Window assembly according to claim 1, wherein the mounting has an inner mounting leg, an outer mounting leg, and a mounting base connecting the inner mounting leg to the outer mounting leg.

13. Window assembly according to claim 12, wherein the sealing portion comprises a front sealing lip being disposed at a transition between the mounting leg and the mounting base.

14. Window assembly according to claim 13, wherein the sealing portion comprises a rear sealing lip being disposed at one of an end of the mounting leg and at the door frame member.

15. Window pane for a window assembly according to claim 1,
    wherein the window section and the guiding section are integrally formed as a single unitary member.

16. Window sealing profile for a window assembly according to claim 1, the window sealing profile comprising:
  the mounting leg having an inner mounting leg, an outer mounting leg, and the mounting base connecting the inner mounting leg to the outer mounting leg; and
  the sealing portion having a front sealing lip disposed at a transition between the inner mounting leg and the mounting base, and
  wherein the sealing portion comprises an inner sealing bulge disposed separate from and to the rear relative to the front sealing lip.

17. Window assembly according to claim 1, wherein the sealing portion comprises an intermediate sealing member having a front contact surface engaging the window pane, and having a rear contact surface engaging the door frame member.

18. Window assembly according to claim 1 wherein the sealing portion comprises an intermediate sealing member having a front contact surface engaging the window pane, and having a rear contact surface engaging the door frame member.

19. Window assembly of claim 1 wherein the guiding member is a separate component from the guiding bracket.

20. Window assembly according to claim 1 wherein sealing portion comprises a front sealing lip being disposed at a transition between the mounting leg and the mounting base.

* * * * *